United States Patent
Kotani et al.

[19]

[11] Patent Number: 6,154,325
[45] Date of Patent: Nov. 28, 2000

[54] LENS BARREL HAVING A MULTIPLE SCREW AND CAM ACTION TO DRIVE PLURAL LENS UNITS

[75] Inventors: Noriyasu Kotani, Tokyo; Hidenori Miyamoto, Urayasu, both of Japan

[73] Assignee: Nikon Corporation, Tokyo, Japan

[21] Appl. No.: 09/022,902

[22] Filed: Feb. 12, 1998

[30] Foreign Application Priority Data

Feb. 12, 1997 [JP] Japan ..................................... 9-027977

[51] Int. Cl.[7] .............................. G02B 15/14; G02B 7/02
[52] U.S. Cl. ........................... 359/699; 359/700; 359/829
[58] Field of Search .................................. 359/823, 699, 359/700, 701, 829, 821, 704

[56] References Cited

U.S. PATENT DOCUMENTS 5,699,200  12/1997  Uno et al. ................................ 359/700
5,701,206  12/1997  Sasaki et al. ............................ 359/704
6,011,659  1/2000  Onda ........................................ 359/704

FOREIGN PATENT DOCUMENTS

8-5887  1/1996  Japan .

Primary Examiner—Georgia Epps
Assistant Examiner—Saeed Seyrafi

[57] ABSTRACT

A camera lens barrel includes a multiple thread screw mechanism that rotates a drive tube. Drive tube moves along an optical axis while rotating with respect to a fixed unit. Due to an action of a first cam during the rotation of the drive tube, a cam tube moves along the optical axis with respect to the drive tube. A first lens unit is integrated with the cam tube and rotates with respect to the cam tube. During rotation of the first lens unit, a second lens unit moves along the optical axis with respect to the cam tube due to an action of a second cam. The multiple thread screw mechanism inhibits movement of the drive tube along the optical axis until the drive tube is rotated to a predetermined angle of rotation.

20 Claims, 7 Drawing Sheets

LENS BARREL HAVING A MULTIPLE SCREW AND CAM ACTION TO DRIVE PLURAL LENS UNITS

CROSS-REFERENCE TO RELATED APPLICATIONS

This application is based upon and claims priority of Japanese Patent Application No. 09-027977, filed Feb. 12, 1997, the contents being incorporated herein by reference.

BACKGROUND OF THE INVENTION

The present invention relates to a photographic lens barrel disposed in a camera or similar device, and in particular to a lens barrel which drives plural lens units in the optical axis direction using a multiple thread screw and cam action.

A prior art example of a zoom lens barrel of a camera is disclosed in Japanese Laid-Open Patent Publication JP-A-8-5887. This prior art lens barrel includes a rotary advance movement tube. Due to the action of a multiple thread screw and a cam tube inserted into an internal circumference of the rotary advance movement tube, rotary advance movement tube rotates while moving in an optical axis direction. This combined multiple thread screw and cam action causes a first, second, and third lens group to move in the optical axis direction, enabling the lens barrel to perform a zooming operation. In addition, the lens groups also move as a result of still further cam actions. As a result of this zooming operation, the lens barrel extends from a collapsed position with respect to a camera body, to a wide angle end position, and to a telephoto position.

The total amount of movement of each lens group during a zooming operation is dependent upon three different types of movement. First, the amount of movement of the lens groups is dependent upon the amount of movement of the rotation advance tube that results from the described multiple thread screw action. Second, the amount of movement of the lens groups is dependent upon the amount of movement of the cam tube with respect to the rotation advance tube that results from the cam action accompanying the rotation of the rotation advance tube. Third, the amount of movement of the lens groups is dependent upon the amount of movement of each lens group with respect to the cam tube that results from the other cam action.

In a prior art zoom lens barrel, the cam tube rotates to move the lens barrel from a collapsed position to a wide angle end position, extending the lens barrel in an optical axis direction. In this wide angle end position, a third lens group closest to the film surface that corresponds to a first lens unit is not extended. On the other hand, a first and a second lens group that correspond to a second lens unit extend a comparatively large amount in the optical axis direction. As the lens barrel is moved from the wide angle end position to a telephoto end position, the third lens group must be moved a comparative distance along the optical axis. More particularly, when moving from the collapsed position to the wide angle end position, the extension of the third lens group that results from the extension of the rotation advance tube retracts the third lens group toward the film surface with respect to the cam tube. As a result, the third lens group is extended a relatively short distance for the wide angle end position. But, when driving from the wide angle end position to the telephoto end position, it is necessary for the third lens group to extend a relatively large amount with respect to the cam tube.

In order to properly extend the prior art lens barrel, it is necessary that a cam groove of the cam tube include regions which cause the third lens group to move in a retraction direction. These regions increase the necessary length of the cam tube in the optical axis direction. As a result of this increased length of the cam tube, the thickness of the camera increases, making the camera larger. On the other hand, when the amount of retraction of the third lens group is suppressed by not including a retraction direction driving region in the cam groove, the amount of movement of the rotation advance tube in the optical axis direction is also reduced. In order to reduce the amount of movement of the rotation advance tube in the optical axis direction, the amount of rotation must also be reduced. In doing so, since the amount of movement of the first and second lens groups is relatively large, not only is it necessary to make the cam tube long, but the inclination of the cam groove for movement of the first and second lens groups must also be steep. This steep inclination of the cam groove that is necessary for the movement of the first and second lens groups causes the load of the first and second lens groups to increase. As a result of this increased load, accuracy of movement of the first and second lens groups is corrupted.

BRIEF SUMMARY OF THE INVENTION

It is therefore an object of the present invention to provide a camera that has a lens barrel that requires minimal extension and maintains smooth extension operation of lens groups.

It is a further object of the present invention to provide a lens barrel in which movement of one lens group can be limited without effecting movement of other lens groups.

It is yet another object of the present invention to provide a lens barrel in which accuracy of movement of a lens group is increased.

It is yet another object of the present invention to provide a lens barrel that minimizes the amount of extension necessary to fully extend plural lens units.

It is yet another object of the present invention to provide a lens barrel that limits movement of a first lens without restricting movement of a second lens.

Objects of the invention are achieved by a lens barrel that has a plurality of lens groups. The lens barrel, which retractably extends in an optical axis direction, includes a multiple thread screw mechanism. A moving member, that has a predetermined angle of rotation, rotates about, and moves the plurality of lens groups along, the optical axis. The multiple thread screw mechanism inhibits movement of the moving member along the optical axis until the moving member is rotated to the predetermined angle of rotation.

Objects of the invention are also achieved by another lens barrel that has a plurality of lens groups, wherein the lens barrel retractably extends along an optical axis, and a multiple thread screw mechanism is formed within a tubular member. A moving member that has a predetermined angle of rotation angle, moves along the optical axis while rotating with respect to the tubular member. A cam mechanism is interconnected with the moving member and moves the plurality of lens groups along the optical axis. The multiple thread screw mechanism inhibits movement of the moving member until the moving member is rotated to the predetermined angle of rotation.

Further objects of the invention are achieved by another lens barrel that retractably extends along an optical axis and has a multiple thread screw mechanism formed within a tubular member. A first moving element that has a first cam action, moves along the optical axis while rotating with respect to the tubular member. A second movable element that has a second cam action, moves with the first moving element as a result of the first cam action. A first lens unit moves with the second moving element, and a second lens unit rotates with the second moving element and moves along the optical axis relative to the second moving element as a result of the second cam action. The multiple thread screw mechanism inhibits movement of the first moving member along the optical axis until the first moving element is rotated to the predetermined angle of rotation.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the preferred embodiments of the present invention, examples of which are illustrated in the accompanying drawings, wherein like reference numerals refer to like elements throughout.

Figure 1:
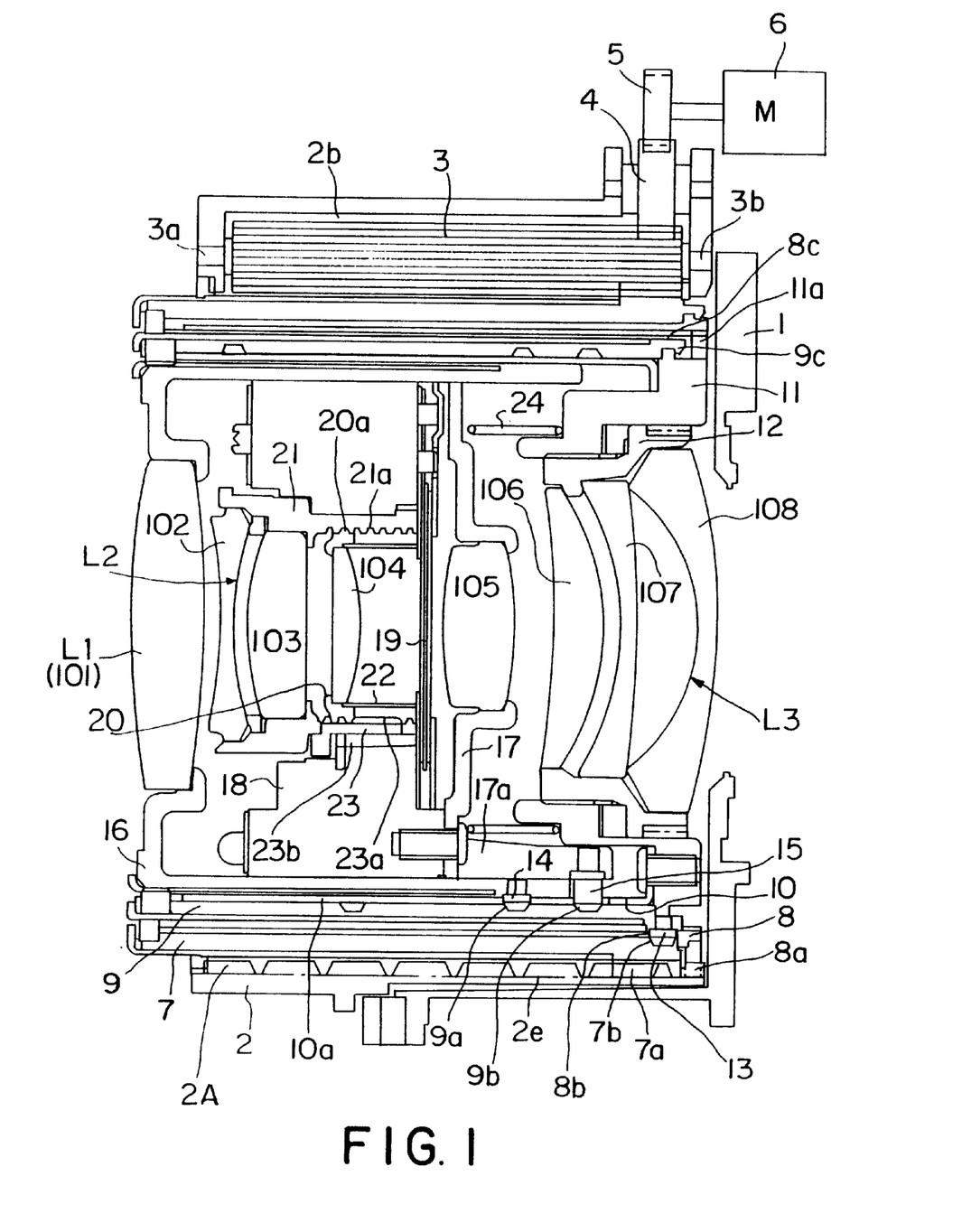
FIG. 1 is a cross sectional view of a lens barrel in a collapsed position according to a preferred embodiment of the present invention.

A zoom lens barrel according to a preferred embodiment of the present invention is illustrated in FIGS. 1–8. When not in use, a camera has its lens barrel in a collapsed position as illustrated in FIG. 1. When the camera is in use, the lens barrel is driven in an optical axis driven to a wide angle end position illustrated in FIG. 2. From this position, the lens barrel can be zoomed to any position between the wide angle position and a telephoto end position, illustrated in FIG. 3, using a predetermined zoom actuation.

Figure 6:
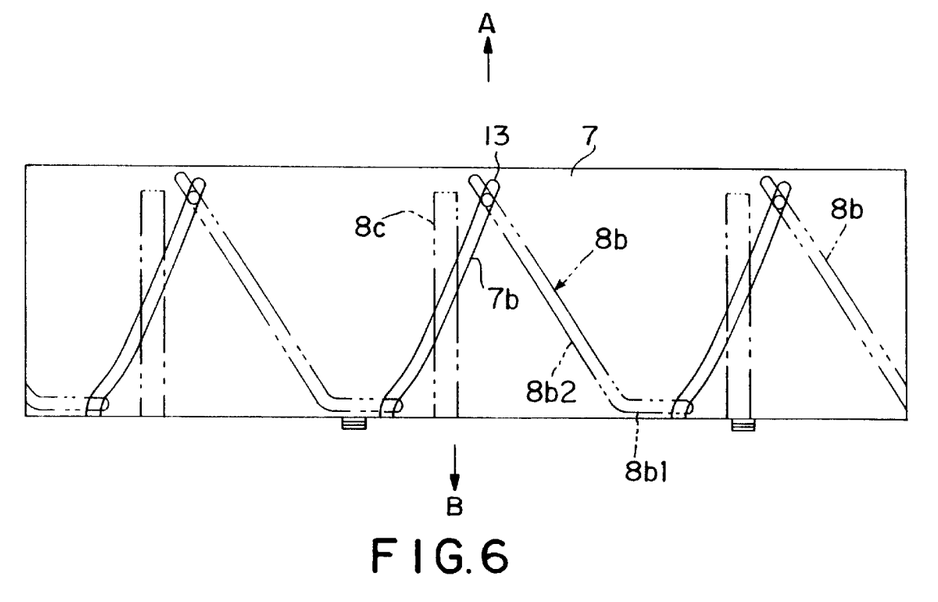
FIG. 6 is a sectional view of an inner circumferential surface of a lens barrel drive tube according to a preferred embodiment of the present invention.

As illustrated in FIG. 1, a fixed tube 2 is fixedly attached to a camera body 1. A female multiple thread screw 2A is formed in an inner circumferential surface of fixed tube 2. A drive gear 3 having rotary shafts 3a, 3b is received, extending in the optical axis direction, in a gear seating unit 2b formed in a portion of fixed tube 2. A motor 6 exerts a rotary force on reduction gears 4 and 5 to rotate drive gear 3. A drive tube 7 is rotatably received in the inner circumferential surface of fixed tube 2. A male multiple thread screw 7a formed on an outer circumferential surface of drive tube 7 is in engagement with a female multiple thread screw 2A of fixed tube 2. As illustrated in FIG. 6, a cam groove 7b is formed in an inner circumferential surface of drive tube 7.

Figure 4A:
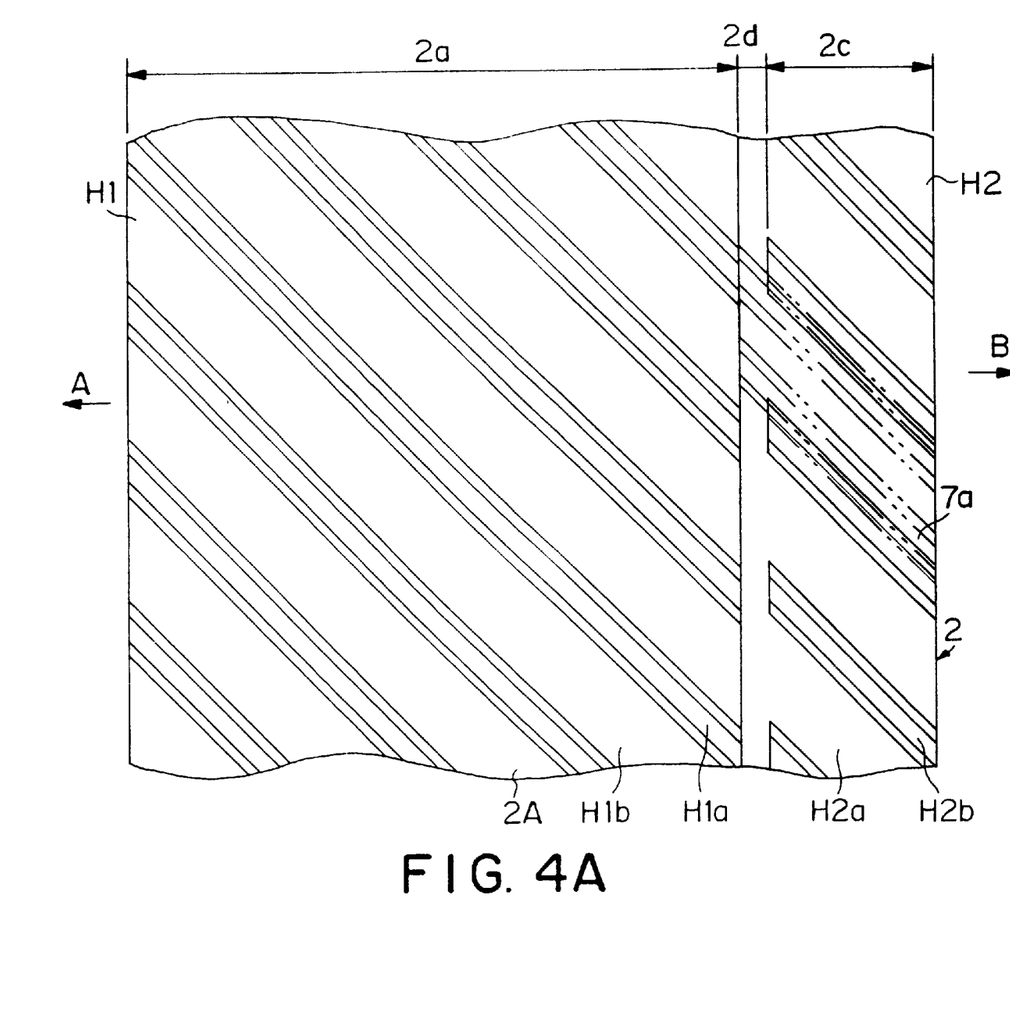
FIG. 4A is a sectional view of thread portions of an inner circumferential surface of a lens barrel fixed tube according to a preferred embodiment of the present invention.
Figure 4B:
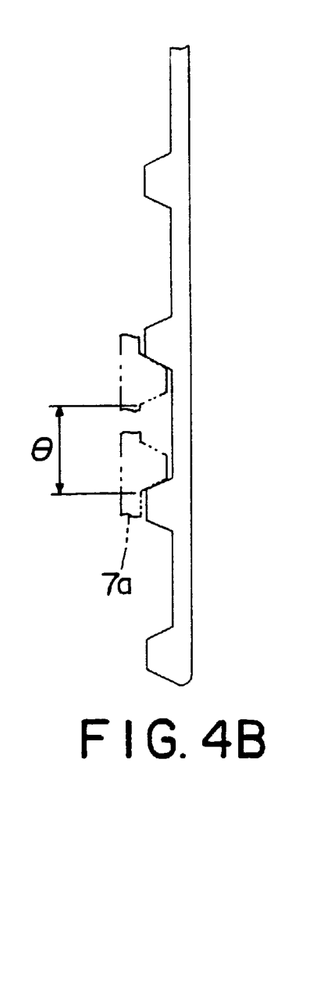
FIG. 4B is a side elevational view of the thread portions of FIG. 4A.
Figure 5A:
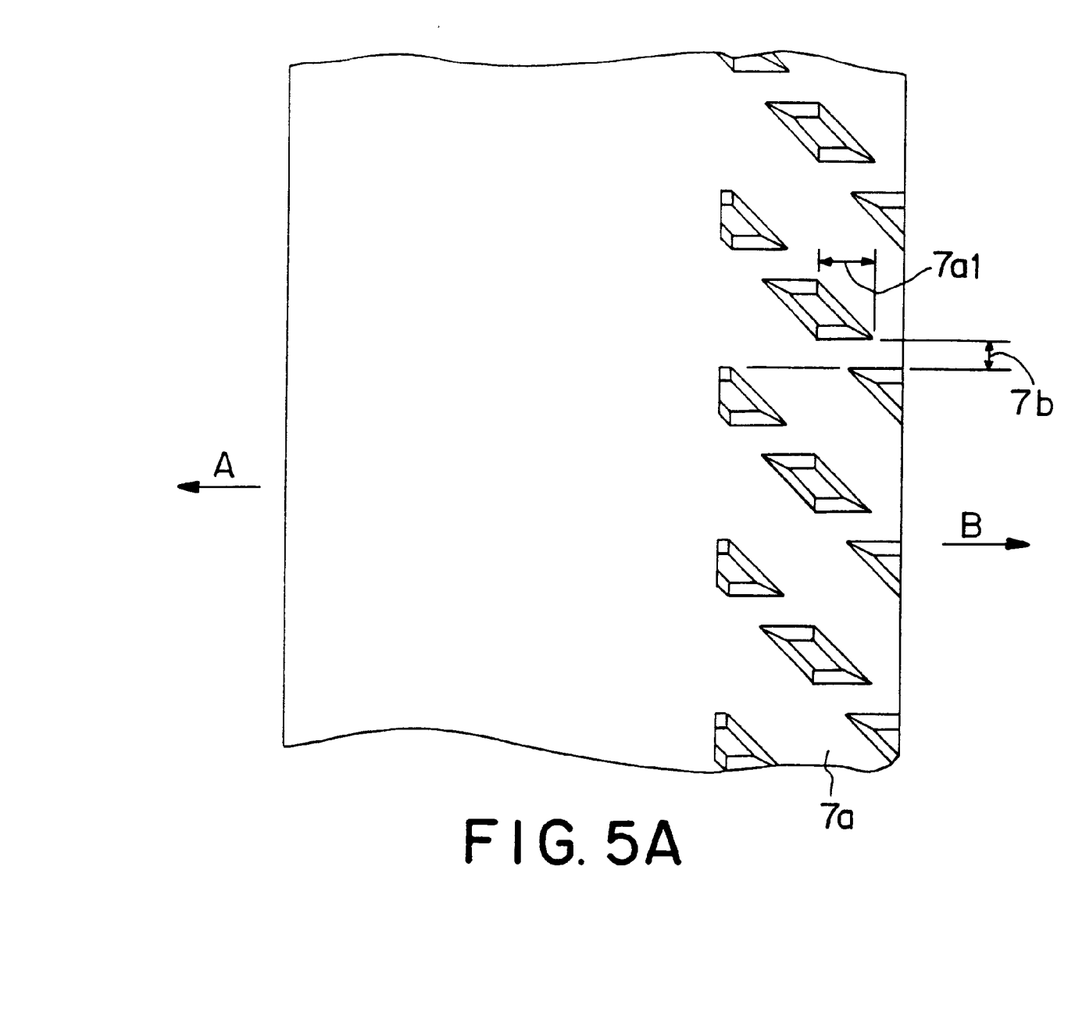
FIG. 5A is a sectional view of an outer circumferential surface of a lens barrel drive tube according to a preferred embodiment of the present invention.
Figure 5B:
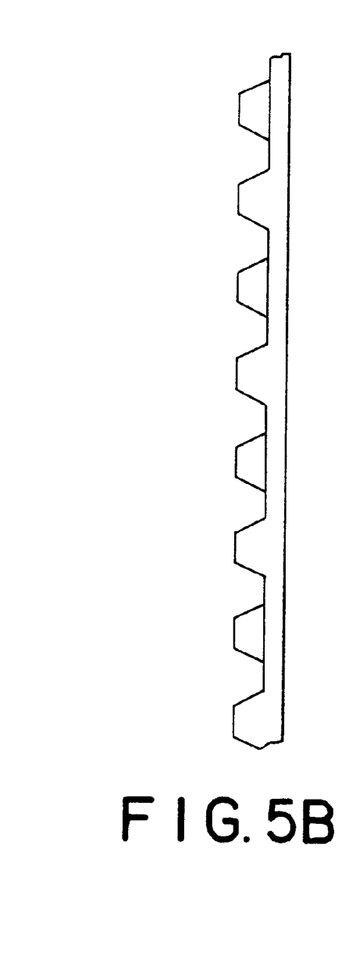
FIG. 5B is a side elevational view of the outer circumferential surface of the lens barrel drive tube of FIG. 5A.

FIG. 4A illustrates the inner circumferential surface and FIG. 4B illustrates an end surface of fixed tube 2. FIG. 5A illustrates the outer circumferential surface and FIG. 5B illustrates an end surface of drive tube 7. An arrow "A" denotes a direction of lens barrel extension, and an arrow "B" denotes a direction of lens barrel retraction.

As illustrated in FIG. 4A, female multiple thread screw 2A of fixed tube 2 has a first screw portion H1 positioned at an end of fixed tube 2 in the extension direction A. First screw portion H1 corresponds to a range 2a extending along fixed tube end 2, from the end of fixed tube 2 in extension direction A to a rear end of fixed tube 2 located in retraction direction B. A second screw portion H2 is formed along a range 2c extending from the rear end located in retraction direction B towards first screw portion H1.

A trough portion H1a is formed in first screw portion H1, at a predetermined pitch interval, between thread portions H1b. Likewise, a trough portion H2a is formed between thread portions H2b of second screw portion H2. A distance between thread portions H2b of second screw portion H2 corresponds to a width of trough portion H2a. Likewise, a distance between thread portions H1b of first screw portion H1 corresponds to a width of trough portion H1a. The width of trough portion H2a is wider than the width of trough portion H1a.

A range 2d in which a screw portion is not formed extends between screw portions H1 and H2. Range 2d has a curved surface that is equal in height to trough portion H2a of second screw portion H2. As illustrated in FIG. 5A, the width of range 2d becomes narrower than an interval 7a1 of the thread portions of male multiple thread screw 7a of drive tube 7. A fixed interval 7b is intermittently formed in which male multiple thread screw 7a of drive tube 7 does not continue. The thread of drive gear 3 engages in interval portion 7b, and drive tube 7 receives rotary force from drive gear 3. As a result, male multiple thread screw 7a includes both a screw mechanism and a gear receiving rotary transmission mechanism.

When the lens barrel is in the collapsed position illustrated in FIG. 1, male multiple thread screw 7a is in gear with second screw portion H2 of fixed tube 2. Drive tube 7 is rotated about the optical axis in lens barrel extension direction A. As illustrated in FIGS. 4A and 4B, during this initial rotation of drive tube 7, the thread portion of male multiple thread screw 7a moves within trough portion H2a of second screw portion H2. Movement of the thread portion of male multiple thread screw 7a remains within trough portion H2a of second screw portion H2 until the angle of rotation of drive tube 7 reaches a predetermined angle θ. Male multiple thread screw 7a does not add force in the optical axis direction to drive tube 7. Accordingly, from the collapsed position, drive tube 7 initially rotates but does not move in the optical axis direction.

When the angle of rotation of drive tube 7 reaches predetermined angle θ, the thread of male multiple thread screw 7a engages with thread portion H2b of second screw portion H2. Drive tube 7, while rotating, begins to move in the optical axis direction (A direction). Since the width of region 2d between two screw portions H1 and H2 is narrower than interval 7a1 of the thread portion of male multiple thread screw 7a, when the rotation of drive tube 7 continues, male multiple thread screw 7a moves from second screw portion H2 to first screw portion H1. Thereafter, drive tube 7 continuously moves in direction A while in gear engagement with first screw portion H1.

As illustrated in FIG. 1, a first guide tube 8 is inserted into the inner circumferential surface of drive tube 7. First guide tube 8 is freely rotatable about the optical axis with respect to drive tube 7, and is arranged so that first guide tube 8 does not move in the optical axis direction with respect to the drive tube 7. As illustrated in FIG. 6, a cam groove 8b is formed in first guide tube 8. In addition, a rectilinear groove 8c is formed in the inner circumferential surface of first guide tube 8. A follower 8a is formed in the rear end portion of first guide tube 8 and engages in a rectilinear groove 2e formed in fixed tube 2. Accordingly, when drive tube 7 rotates and moves in the optical axis direction, first guide tube 8 moves in the optical axis direction integrally with drive tube 7 but does not rotate with respect to fixed tube 2.

A cam tube 9 is disposed in the inner circumferential surface of first guide tube 8. A cam follower 13 is set into a rear end portion of cam tube 9. As illustrated in FIG. 6, cam follower 13 engages cam groove 8b of first guide tube 8. Accordingly, when drive tube 7 rotates, cam tube 9 moves in the optical axis direction while rotating about the optical axis with respect to both drive tube 7 and first guide tube 8.

Figure 7:
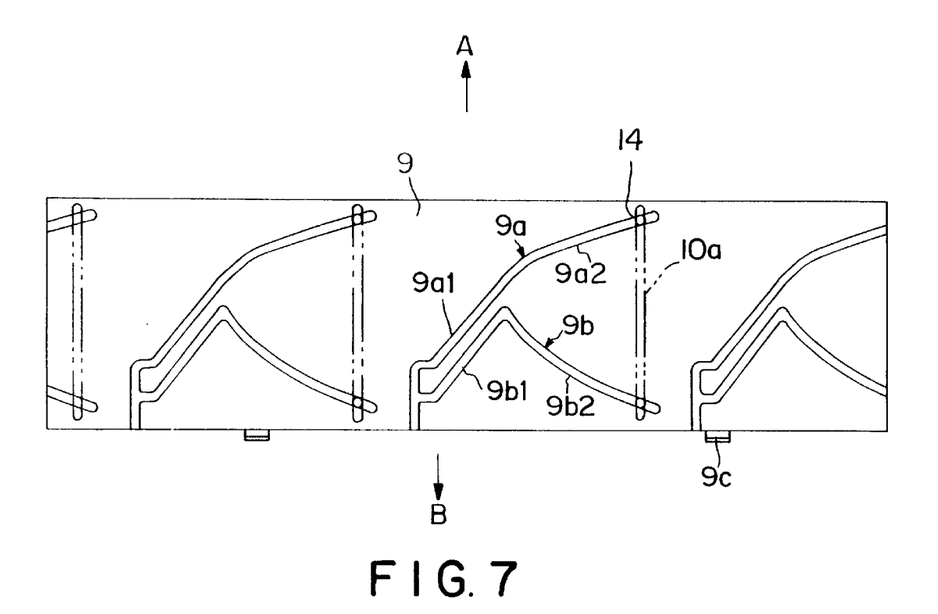
FIG. 7 is a sectional view of an inner circumferential surface of a lens barrel cam tube according to a preferred embodiment of the present invention.

As illustrated in FIG. 1 and FIG. 7, cam grooves 9a and 9b are formed in the inner circumferential surface of cam tube 9. A lens frame 11 is rotatably supported by a support member 9c in the rear end portion of cam tube 9. Lens frame 11 does not move in the optical axis direction. A projecting portion 11a of lens frame 11 is in engagement with rectilinear groove 8c of first guide tube 8. A third lens group L3, comprising lenses 106, 107, and 108, is maintained by a lens compartment 12 in lens frame 11. Accompanying movement of cam tube 9 in the optical axis direction, third lens group L3 moves relative to drive tube 7 via lens frame 11 and lens compartment 12. However, due to the engagement of projecting portion 11a and rectilinear groove 8c, third lens group L3 does not rotate with respect to first guide tube 8, that is, with respect to fixed tube 2.

As illustrated in FIG. 1, a second guide tube 10 is inserted into the inner circumferential surface of cam tube 9. A rear end of second guide tube 10 is mounted to lens frame 11 by a screw. Accordingly, second guide tube 10 does not move, but is permitted to rotate with respect to cam tube 9. As illustrated in FIG. 7, rectilinear groove 10a is formed in second guide tube 10.

As illustrated in FIG. 1, a lens frame 16 which maintains a first lens group L1, comprising a lens 101, is inserted into second guide tube 10. A cam follower 14 set into the outer circumferential surface of a lens frame 16 engages with cam groove 9a of cam tube 9, passing through rectilinear groove 10a of second guide tube 10. Accordingly, first lens group L1 moves in the optical axis direction with respect to cam tube 9, due to the rotation of cam tube 9 and engagement of cam follower 14.

A lens 105 is supportingly positioned by a lens frame 17. A cam follower 15 set into a projection 17a of lens frame 17 passes through rectilinear groove 10a of second guide tube 10 and engages cam groove 9b of cam tube 9. A shutter 19 is driven by a shutter device 18. Lens frame 17 is fixedly attached to shutter device 18 by a screw. A front frame 21 is fitted into an inner circumferential surface of shutter device 18. Front frame 21 maintains lenses 102 and 103. A female screw 21a is formed in a rear inner circumferential surface of front frame 21. Female screw 21a is in threaded engagement with a male screw 20a of a lens frame 20.

A focusing lens 104 is maintained in lens frame 20 and a key groove (not shown) is formed in an outer circumferential surface of focusing lens 104, parallel to the optical axis. A key 23a of a drive bridge 23 is in engagement with the key groove. Drive bridge 23 is rotatable around the optical axis, and a drive ring claw (not shown) elevated from a shutter drive mechanism is in engagement with a groove 23b formed on an exterior of the drive ring claw. When the drive ring rotates, lens frame 20 is rotated by a claw of drive ring claw and drive bridge 23. As a result of this screwing action, lens frame 20 and focusing lens 104 move in the optical axis direction.

A spring 22 takes up the play between male screw 20a and female screw 21a. A spring 24 takes up the play between cam groove 9b and cam follower 15, in addition to the play between first guide tube 8 and drive tube 7.

Movement of the zoom lens barrel from the collapsed position illustrated in FIG. 1 to the wide angle end position illustrated in FIG. 2, according to a preferred embodiment of the present invention, will be described next.

When the lens barrel is in the collapsed position illustrated in FIG. 1 in which movement is not permitted, motor 6 is then rotated in lens barrel extension direction A. This rotation is transmitted to drive gear 3 from reduction gears 4 and 5. As a result, drive gear rotates drive tube 7 about the optical axis via male multiple thread screw 7a, which functions as a gear. Initially, male multiple thread screw 7a of drive tube 7 is in gear engagement with second screw portion H2 of fixed tube 2. Initially, the thread of male multiple thread screw 7a moves in trough portion H2a of screw portion H2 until the angle of rotation of drive tube 7 reaches predetermined angle θ. As a result, drive tube 7 rotates but does not move in the optical axis direction.

Due to the initial rotation of drive tube 7, cam follower 13 which has been set into cam tube 9 is driven by cam groove 7b and cam groove 8b of first guide tube 8. As a result, cam tube 9, while rotating about the optical axis, extends in the optical axis direction with respect to drive tube 7. Third lens group L3, which has been integrated with cam tube 9, also integrally extends. However, as illustrated in FIG. 6, because cam follower 13 initially moves in a region 8b1 of cam groove 8b, the length of the extension of cam tube 9, and therefore the corresponding extension of third lens group L3, is relatively small with respect to drive tube 7.

As illustrated in FIG. 1, a second lens group L2 is formed that includes lens 102, 103, 104 and 105. The amount of movement of third lens group L3 relative to fixed tube 2 in the optical axis direction is the total amount of movement of drive tube 7 with respect to fixed tube 2, resulting from the action of male multiple thread screw 7a, and the amount of movement of third lens group L3 with respect to drive tube 7 due to the cam action. However, drive tube 7 does not move in the optical axis direction until the angle of rotation of drive tube 7 reaches predetermined angle θ. Since the amount of extension of cam tube 9 with respect to drive tube 7 is very slight, there is relatively no movement of third lens group L3 in the optical axis direction. In a preferred embodiment of the present invention, because the rotation initially does not move drive tube 7 in the optical axis direction, it is possible to limit the extension of third lens group in the optical axis direction without reducing the amount of rotation of drive tube 7.

On the other hand, due to the rotation of cam tube 9, cam followers 14 and 15 engaged with cam grooves 9a and 9b are driven by cam tube 9. First lens group L1 and second lens group L2 move in the optical axis direction with respect to cam tube 9. At the same time, cam followers 14 and 15 pass through regions 9a1 and 9b1 of corresponding cam grooves 9a and 9b. Since regions 9a1 and 9b1 are parallel, the spacing of first lens group L1 and second lens group L2 does not change.

The amount of movement of first lens groups L1 and second lens group L2 becomes equivalent to the total amount of movement that results from the cam action of cam tube 9 with respect to drive tube 7, and the amount of movement of lens group L1 and L2 with respect to cam tube 9, due to the cam action. In other words, first lens groups L1 and second lens group L2 become extended with respect to fixed tube 2 by a distance corresponding to the amount of extension of cam tube 9 added to the amount of movement of third lens group L3. The amount of extension with respect to cam tube 9 depends on the amount of rotation of cam tube 9. The amount of rotation of cam tube 9 depends on the amount of rotation of drive tube 7. Because, in a preferred embodiment of the present invention, the amount of rotation of drive tube 7 can be sufficiently precise, the inclination of cam grooves 9a and 9b of cam tube 9, while not excessive, is sufficient to adequately extend first lens groups L1 and second lens group L2.

Subsequently, when the angle of rotation of drive tube 7 reaches predetermined angle θ, drive tube 7 begins extending in the optical axis direction. After a predetermined amount of movement drive tube 7 approaches the wide angle end position illustrated in FIG. 2.

Movement of the lens barrel from the wide angle end position illustrated in FIG. 2 to a telephoto end position illustrated in FIG. 3, according to a preferred embodiment of the present invention, will be described next.

Figure 2:
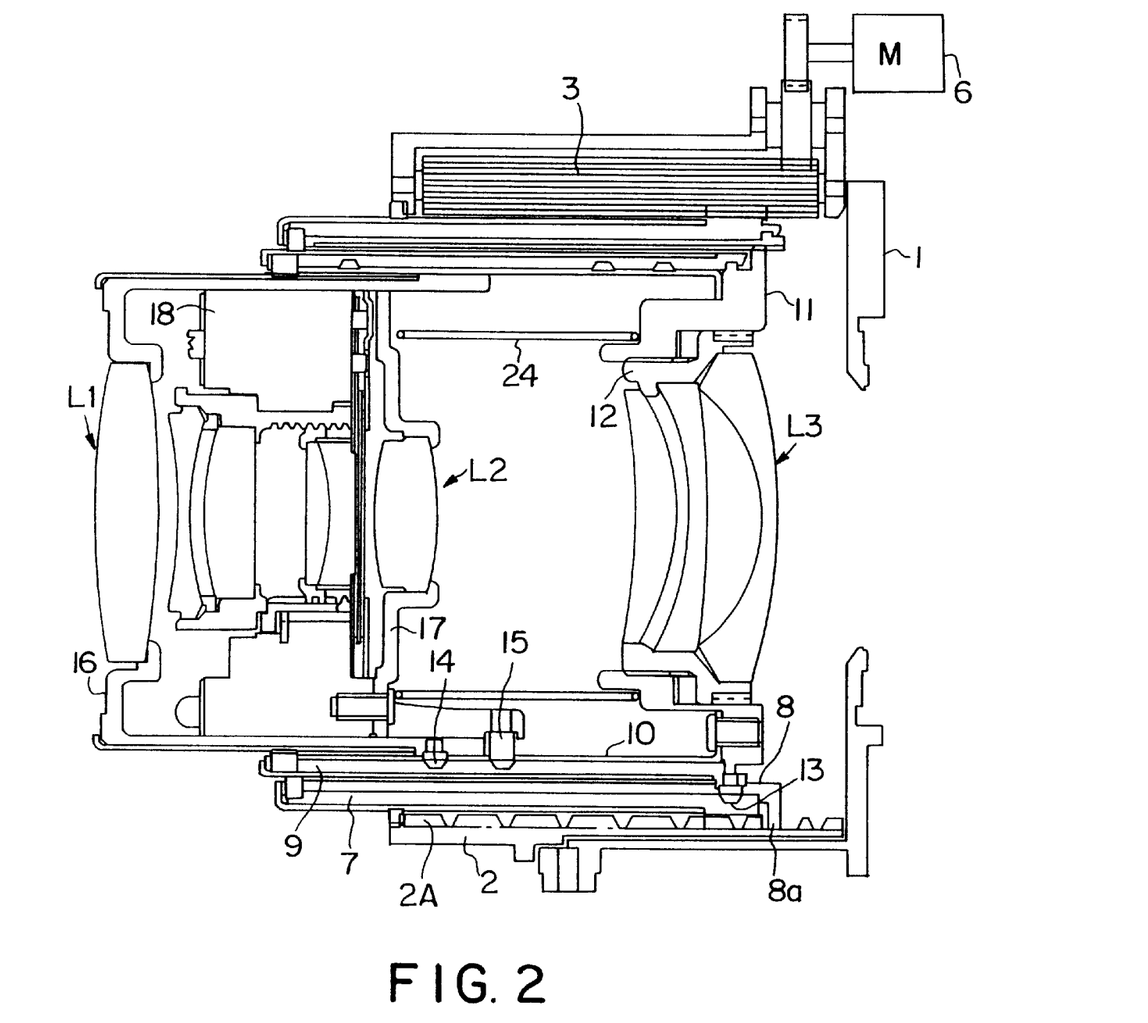
FIG. 2 is a cross sectional view of a lens barrel in a wide angle end position according to a preferred embodiment of the present invention.

When the lens barrel is in the wide angle end position illustrated in FIG. 2 and a zoom-up actuation is performed, motor 6 rotates in lens barrel extension direction A. This rotation is transmitted to drive tube 7 as discussed above. Because male multiple thread screw 7a of drive tube 7 is in gear with first screw portion H1 of fixed tube 2, drive tube 7, while rotating, further extends in the optical axis direction. Cam tube 9 and third lens group L3 also integrally extend. Moreover, due to the rotation of drive tube 7, cam follower 13 is driven by cam groove 7b and cam groove 8b of first guide groove 8. As a result, cam tube 9 and integrally connected third lens group L3 extend with respect to drive tube 7. At this time, as illustrated in FIG. 6, because cam follower 13 moves in a region 8b2 of cam groove 8b, the amount of movement of third lens group L3 in extension direction A becomes comparatively large. Moreover, first lens groups L1 and second lens group L2 are driven, by similar action, in the optical axis direction. The directions of cam grooves 9a and 9b of cam tube 9 change from corresponding regions 9a1 and 9b1 to corresponding regions 9a2 and 9b2. Since regions 9a2 and 9b2 are no longer parallel, the spacing between lens groups L1 and L2 increases.

Figure 3:
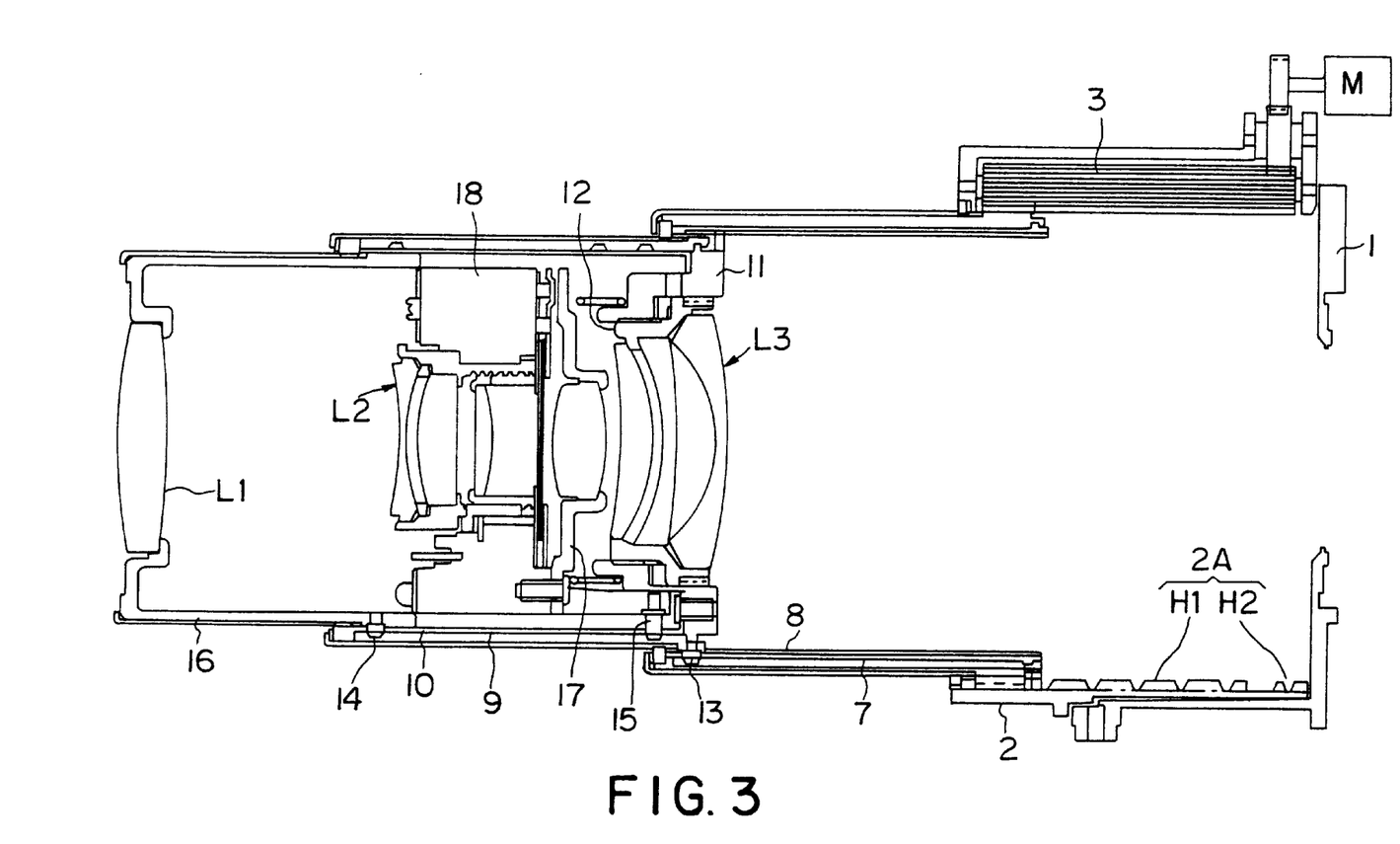
FIG. 3 is a cross sectional view of a lens barrel in a telephoto end position according to a preferred embodiment of the present invention.

When zoom-up actuation continues, movement of the lens barrel is stopped upon reaching the telephoto end position illustrated in FIG. 3. Moreover, when the zoom-up actuation is performed, the lens barrel contracts due to a reverse operation.

Figure 8:
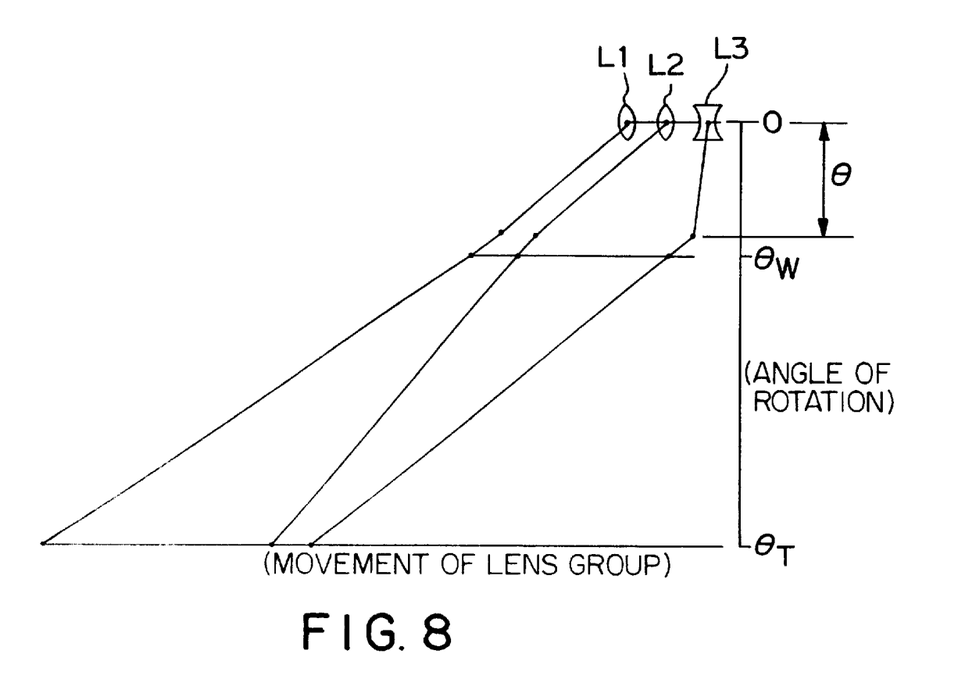
FIG. 8 is a graphical representation of the relationship between an angle of rotation angle of a drive tube and movement of a lens groups according to a preferred embodiment of the present invention.

FIG. 8 graphically illustrates the movement of each lens group L1, L2, and L3 from the collapsed position to the telephoto position. The ordinate of the graph corresponds to the angle of rotation of drive tube 7, and the abscissa corresponds to the amount of movement of lens groups L1, L2, and L3. θW is the angle of rotation of drive tube 7 from the collapsed position to the wide angle end position. θT is the angle of rotation of drive tube 7 from the collapsed position to the telephoto end position. As illustrated in FIG. 8, movement of third lens group L3 is minimal until the angle of rotation reaches predetermined angle θ. When the rotation angle reaches predetermined θ, third lens group L3 extends substantially. Moreover, because the amount of rotation of drive tube 7 is large in an interval from 0–θW, the inclination of cam groove 9a and 9b of cam 9 is relatively gradual, and lens movement is not impeded.

In the above-described preferred embodiment of the present invention, female multiple thread screw 2A and male multiple thread screw 7a respectively correspond to a multiple thread screw mechanism. Fixed tube 2 corresponds to a fixed unit; drive tube 7 corresponds to a first moving element; cam tube 9 corresponds to a second moving element; lens frame 11, lens compartment 12 and third lens group L3 correspond to a first lens unit; lens frames 16 and 17, shutter device 18, first and second lens groups L1, L2, etc. correspond to a second lens unit. While a preferred embodiment of the present invention is described in terms of these particular components or elements for the lens barrel, it will be appreciated by those skilled in the art that other equivalent mechanical or electromechanical elements for the lens barrel may be also be used to achieve the results of the present invention.

In the above-described preferred embodiment of the present invention, first and second lens groups are described as corresponding to the second lens unit, but the second lens unit may have one lens group. Moreover, the movement of drive tube 7 in the optical axis direction is temporarily stopped within second screw portion H2 in fixed tube 2. However, stopping the movement of drive tube 7 may also be accomplished using methods or structural elements other than second screw portion H2.

Moreover, an embodiment in which cam grooves are used to drive first through third lens groups in the optical axis direction during the rotation of drive tube 7 may also be adopted in other embodiments of the present invention. Furthermore, when using regions of nonmovement of drive tube 7 to suppress the movement of at least one lens group in order to further extend the other lens groups, modes for retracting lens groups L1, L2, and L3 may be used other than cam groove(s).

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A lens barrel having a plurality of lens groups and that retractably extends along an optical axis, the lens barrel comprising:
   a rotatable moving member to drive at least one lens group in the optical axis direction by rotation thereof, the rotatable moving member including a threaded portion; and
   a fixed member with respect to which the rotatable moving member rotates, the fixed member including a threaded portion and an unthreaded portion,
   wherein the threaded portion of the rotatable moving member is received within the unthreaded portion of the fixed member, and the rotatable moving member rotates, without moving in the optical axis direction, to drive the at least one lens group.

2. A lens barrel according to claim 1, further comprising a cam mechanism interconnected with the rotatable moving member to move the plurality of lens groups along the optical axis.

3. A lens barrel according to claim 1, wherein the lens barrel is a zoom lens barrel and extends from a collapsed position to a wide angle end position to a telephoto position.

4. A lens barrel according to claim 3, wherein rotation of the rotatable moving member remains constant as the lens barrel moves from the collapsed position to the wide angle end position to the telephoto position, and one of the plurality of lens groups is inhibited from moving in the optical axis direction until the threaded portion of the rotatable moving member is rotated to a position in threaded engagement with the threaded portion of the fixed member.

5. A lens barrel according to claim 1, further comprising a first lens group spaced a distance from a second lens group, wherein the spaced distance remains constant until the rotatable moving member is rotated to a position in which the threaded portion of the rotatable moving member and the threaded portion of the fixed member are in threaded engagement.

6. A lens barrel according to claim 1, further comprising a first lens group spaced a distance from a second lens group, wherein the spaced distance increases after the rotatable moving member is rotated to a position in which the threaded portion of the rotatable moving member and the threaded portion of the fixed member are in threaded engagement.

7. A lens barrel according to claim 1, wherein the fixed member is threaded so that the rotatable moving member rotates a predetermined amount from an initial position to a position in which the threaded portion of the rotatable moving member and the threaded portion of the fixed member are in threaded engagement.

8. A lens barrel according to claim 3, wherein rotation of the rotatable moving member within the unthreaded portion inhibits movement of the rotatable moving member in the optical axis direction when the lens barrel is at or between the collapsed position and the wide angle end position.

9. A lens barrel having a plurality of lens groups and that retractably extends along an optical axis, the lens barrel comprising:
    a tubular member;
    a multiple thread screw mechanism formed within the tubular member, the multiple thread screw mechanism including a threaded portion and an unthreaded portion;
    a rotatable moving member having a threaded portion; and
    a cam mechanism interconnected with the rotatable moving member to move at least one of the plurality of lens groups along the optical axis,
    wherein the rotatable moving member rotates, without moving in the optical axis direction, in an initial position with the threaded portion of the rotatable moving member received within the unthreaded portion of the multiple thread screw mechanism, and drives at least one lens group.

10. A lens barrel according to claim 9, wherein the lens barrel is a zoom lens barrel and extends from a collapsed position to a wide angle end position to a telephoto position.

11. A lens barrel according to claim 10, wherein rotation of the rotatable moving member remains constant as the lens barrel moves from the collapsed position to the wide angle end position to the telephoto position, and one of the plurality of lens groups is inhibited from moving in the optical axis direction until the threaded portion of the rotatable moving member is rotated to a position in threaded engagement with the threaded portion of the multiple thread screw mechanism.

12. A lens barrel according to claim 9, further comprising a first lens group spaced a distance from a second lens group, wherein the spaced distance remains constant until the rotatable moving member is rotated to a position in which the threaded portion of the rotatable moving member and the threaded portion of the multiple thread screw mechanism are in threaded engagement.

13. A lens barrel according to claim 9, further comprising a first lens group spaced a distance from a second lens group, wherein the spaced distance increases after the rotatable moving member is rotated to a position in which the threaded portion of the rotatable moving member and the threaded portion of the multiple thread screw mechanism are in threaded engagement.

14. A lens barrel according to claim 9, wherein the multiple thread screw mechanism is threaded so that the multiple thread screw mechanism is not engaged until the rotatable moving member rotates a predetermined amount from an initial position to a position in which the threaded portion of the rotatable moving member and the threaded portion of the multiple thread screw mechanism are in threaded engagement.

15. A lens barrel according to claim 10, wherein rotation of the rotatable moving member within the unthreaded portion inhibits movement of the rotatable moving member in the optical axis direction when the lens barrel is at or between the collapsed position and the wide angle end position.

16. A lens barrel that extends along an optical axis, comprising:
    a tubular member;
    a screw mechanism formed within the tubular member, the screw mechanism having a threaded portion and an unthreaded portion;
    a first rotatable moving element, having a first cam action, and including a threaded portion;
    a second movable element, having a second cam action, that moves with the first moving element as a result of the first cam action;
    a first lens unit that moves with the second moving element; and
    a second lens unit that rotates with the second moving element and moves along the optical axis relative to the second moving element as a result of the second cam action,
    wherein the threaded portion of the first rotatable moving element is received within the unthreaded portion of the screw mechanism, and the first rotatable moving element rotates without moving in the optical axis direction, while at least the first lens unit is moved by the first cam action.

17. A lens barrel according to claim 16, the second lens unit further comprising a first lens group spaced a distance from a second lens group, wherein the spaced distance remains constant until the first moving member is rotated to the predetermined angle of rotation.

18. A lens barrel according to claim 16, the second lens unit further comprising a first lens group spaced a distance from a second lens group, wherein the spaced distance increases after the first moving member is rotated to the predetermined angle of rotation.

19. A lens barrel according to claim 16, wherein the multiple thread screw mechanism is intermittently threaded such that the multiple thread screw mechanism is not engaged until the first moving member is rotated to the predetermined angle of rotation.

20. A camera lens barrel having a lens group, that retractably extends along an optical axis, comprising:

a rotatable moving means for driving at least one lens group in the optical axis direction by rotation thereof, the rotatable moving means including a threaded portion; and a fixed means for inhibiting movement of the rotatable moving means, the rotatable moving means rotating with respect to the fixed means, and the fixed means including a threaded portion and an unthreaded portion, wherein the threaded portion of the rotatable moving means is received within the unthreaded portion of the fixed means, and the rotatable moving means rotates, without moving in the optical axis direction, to drive the at least one lens group.

* * * * *